United States Patent
Fan et al.

(10) Patent No.: US 12,471,059 B2
(45) Date of Patent: Nov. 11, 2025

(54) METHOD AND APPARATUS FOR DATA TRANSMISSION OF MULTI-CARD UE, AND STORAGE MEDIUM, USER EQUIPMENT AND BASE STATION

(71) Applicant: SPREADTRUM COMMUNICATIONS (SHANGHAI) CO., LTD., Shanghai (CN)

(72) Inventors: Wei Fan, Shanghai (CN); Yun Deng, Shanghai (CN); Xinghang Gao, Shanghai (CN); Lifeng Han, Shanghai (CN); Xiangxin Gu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 297 days.

(21) Appl. No.: 17/925,285

(22) PCT Filed: Apr. 2, 2021

(86) PCT No.: PCT/CN2021/085157
§ 371 (c)(1),
(2) Date: Nov. 14, 2022

(87) PCT Pub. No.: WO2021/227699
PCT Pub. Date: Nov. 18, 2021

(65) Prior Publication Data
US 2023/0171734 A1 Jun. 1, 2023

(30) Foreign Application Priority Data
May 14, 2020 (CN) .......................... 202010408113.0

(51) Int. Cl.
*H04W 68/02* (2009.01)
*H04W 72/12* (2023.01)
*H04W 88/06* (2009.01)

(52) U.S. Cl.
CPC ....... *H04W 68/02* (2013.01); *H04W 72/1215* (2013.01); *H04W 88/06* (2013.01)

(58) Field of Classification Search
CPC . H04W 24/10; H04W 56/0005; H04W 76/15; H04W 76/40; H04W 36/0072; H04W 8/20; H04W 52/0238; H04W 8/183
(Continued)

(56) References Cited

U.S. PATENT DOCUMENTS 10,003,990 B2 * 6/2018 Scholand .......... H04W 52/0238
11,382,098 B2 * 7/2022 Li ..................... H04W 56/0005
(Continued)

FOREIGN PATENT DOCUMENTS

| CN | 107333257 A | 11/2017 |
| CN | 107872881 A | 4/2018 |

(Continued)

OTHER PUBLICATIONS

International Search Report for International Application No. PCT/CN2021/085157; Date of Mailing, Jun. 22, 2021.

*Primary Examiner* — William D Cumming
(74) *Attorney, Agent, or Firm* — CANTOR COLBURN LLP

(57) ABSTRACT

A method for data transmission of a multi-card UE is provided. The multi-card UE has at least a first subscriber identity module (SIM) card and a second SIM card, the first SIM card is in a connected status with a network. The method includes: determining a wireless operation demand of the second SIM card, and requesting a transmission time gap from the network according to the wireless operation demand, for enabling the second SIM card to execute a wireless operation in the transmission time gap. The method further includes generating a gap adjustment request according to the wireless operation executed by the second SIM
(Continued)

card, and sending the gap adjustment request to the network, for enabling the network to adjust allocated transmission time gap according to the gap adjustment request.

18 Claims, 9 Drawing Sheets

(58) Field of Classification Search
USPC .............................. 455/67.11, 458; 370/216
See application file for complete search history.

(56) References Cited

U.S. PATENT DOCUMENTS

| | | |
|---|---|---|
| 2013/0150018 A1 | 6/2013 | Su et al. |
| 2015/0381321 A1* | 12/2015 | Scholand .............. H04W 24/10 370/216 |
| 2016/0381588 A1* | 12/2016 | Strobl .................. H04W 24/10 455/67.11 |
| 2017/0359813 A1 | 12/2017 | Lee |
| 2020/0137556 A1 | 4/2020 | Park et al. |
| 2020/0396734 A1* | 12/2020 | Li ..................... H04W 56/0005 |
| 2022/0117018 A1* | 4/2022 | Gu ........................ H04W 8/183 |
| 2023/0171734 A1* | 6/2023 | Fan ....................... H04W 76/15 455/458 |
| 2024/0073765 A1* | 2/2024 | Shrivastava ...... H04W 36/0072 |
| 2024/0129711 A1* | 4/2024 | Kim ........................ H04W 8/20 |
| 2024/0298381 A1* | 9/2024 | Fujishiro ............... H04W 76/40 |

FOREIGN PATENT DOCUMENTS

| | | | |
|---|---|---|---|
| CN | 111107553 A | 5/2020 | |
| CN | 112423338 A | 2/2021 | |
| CN | 113676297 A * | 11/2021 | ........ H04W 72/1215 |
| WO | WO-2021227699 A1 * | 11/2021 | ........ H04W 72/1215 |

* cited by examiner

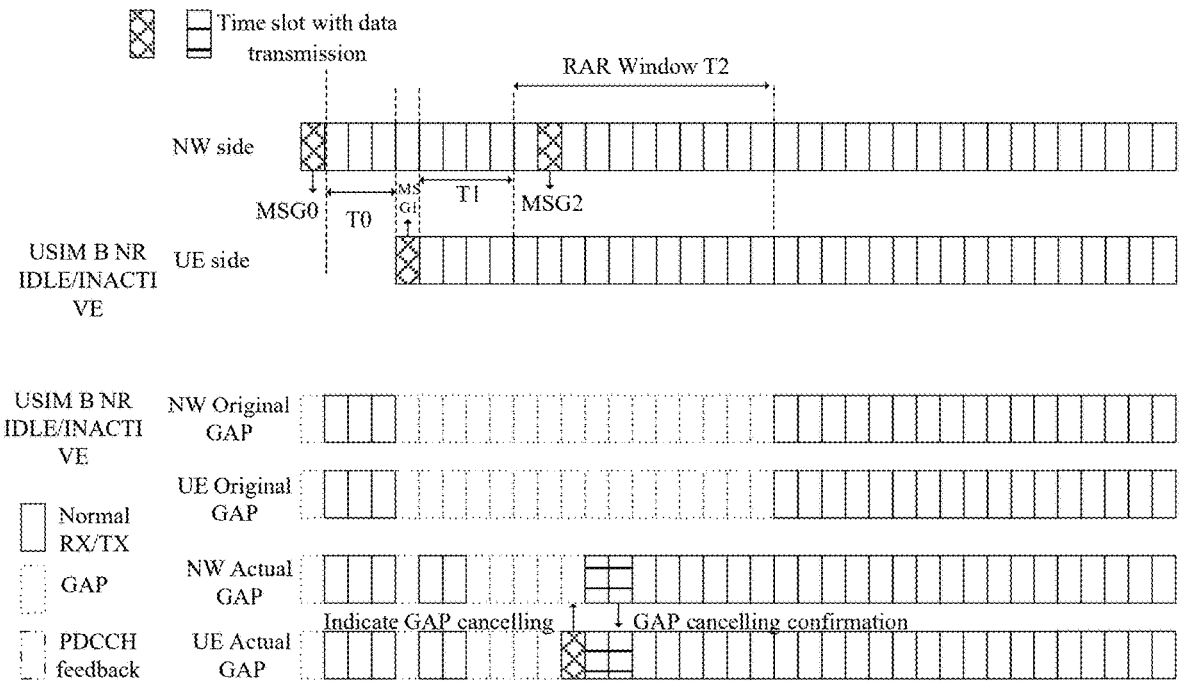

Allocate a transmission time gap for a first subscriber identity module according to a wireless operation demand of a second subscriber identity module of a multi-card UE, so that the second subscriber identity module is allowed to execute a wireless operation in the transmission time gap

S702

Adjust the allocated transmission time gap according to a gap adjustment request when receiving the gap adjustment request sent by the multi-card UE

generating, in response to a paging indicator received by the second SIM card indicating not receiving a secondary common control channel, the gap adjustment request to release a time gap allocated for receiving the secondary common control channel

generating, in response to detecting that the second SIM card needs message retransmission, the gap adjustment request to request the network to extend the transmission time gap

FIG. 11

S102_3 generating, in response to detecting that the second SIM card completes the wireless operation early, the gap adjustment request to release remaining transmission time gap

S102_4 sending the gap adjustment request to the network using dedicated resources

S702_1 releasing, in response to a paging indicator received by the second SIM card indicating not receiving a secondary common control channel, a time gap allocated for receiving the secondary common control channel

S702_2 allocating dedicated resources for the first SIM card, so that the first SIM card sends the gap adjustment request using the dedicated resources

METHOD AND APPARATUS FOR DATA TRANSMISSION OF MULTI-CARD UE, AND STORAGE MEDIUM, USER EQUIPMENT AND BASE STATION

CROSS REFERENCE TO RELATED APPLICATIONS

This is the U.S. national stage of application No. PCT/CN2021/085157, filed on Apr. 2, 2021. Priority under 35 U.S.C. § 119 (a) and 35 U.S.C. § 365 (b) is claimed from Chinese Application No. 202010408113.0 filed May 14, 202, the disclosure of which is also incorporated herein by reference.

FIELD

The present disclosure relates to the field of communication technology, and in particular to a method and a device for data transmission of a multi-card UE, a storage medium, a user equipment and a base station.

BACKGROUND

A multi-card user equipment (UE) refers to a terminal equipment that uses two or more Subscriber Identification Module (SIM) cards or Universal Subscriber Identity Module (USIM) cards.

Taking the UE that can uses two SIM cards (SIM1 and SIM2), i.e. a dual card UE, as an example, two SIM cards of the dual card UE may both occupy communication basebands and radio frequencies (RFs). For example, when SIM1 is in a connected state, SIM2 performs a wireless operation such as paging reception, system information reception, reference signal measurement, and cell search. Further, when receiving a paging message for SIM2, or requiring SIM2 to respond a Radio Resource Control (RRC) on demand system information, or when the user initiates access by SIM2, an operation of accessing network (NW) is performed. Furthermore, when the two SIM cards are both in the connected state, two base stations need to schedule the UE for data transmission in a time division manner. When the two SIM cards share the communication baseband and RF, it is necessary to solve the problem that the two SIM cards may occupy the communication baseband at the same time.

Nowadays, in order to solve the problem that multiple SIM cards of the multi-card terminal share the communication baseband and RF, one way is that the UE receives and transmits signals for one of the cards and discards signals for the other according to the priorities of the services. Another way is that when signals for the other card need to be transmitted or received, the UE sends uplink data buffer information in advance to inform the base station that there is no uplink data to be transmitted. When the other card releases the baseband and RF, the UE sends a scheduling request and sends uplink data buffer information in a subsequent uplink transmission opportunity to inform the base station of the actual amount of data to be transmitted. However, the first way will result in paging failures, degradation of data transmission performance and waste of network wireless resources, which affect network operation indicators. The second way affects the smoothness of data transmission and reduces the efficiency of data transmission.

To solve this problem, another solution is provided, in which when SIM1 is in a connected status with a network (or a base station), the wireless operation of SIM2 can be performed by requesting a transmission time gap (GAP) from the base station, so that SIM2 services can be performed with little impact on SIM1 services. In other words, through the coordination between the dual card UE and the base station, the wireless resources are not wasted, so as to improve the data transmission performance of the two SIM cards of the dual card UE. However, in order to ensure the execution of the wireless operation of SIM2, usually the time required for the wireless operation is estimated and is applied according to the estimated time. However, in actual execution of the wireless operation of SIM2, the operation may fail or end earlier, resulting in mismatch between the applied GAP and the time used by the wireless operation of SIM2. As a result, network resources are wasted, degrading the data transmission performance when the dual card UE shares the communication baseband.

The above problems also exist for a multi-card UE that support multiple SIM cards or multiple USIM cards.

SUMMARY

The technical problem to be solved by the present disclosure is how to improve the data transmission performance when multiple SIM cards of a multi-card UE share the communication baseband.

To solve the above technical problems, the embodiments of the present disclosure provide a method for data transmission of a multi-card UE. The multi-card UE has at least a first subscriber identity module (SIM) card and a second SIM card. The first SIM card is connected to the network. The method includes: determining a wireless operation demand of the second SIM card, and requesting a transmission time gap from the network according to the wireless operation demand, for enabling the second SIM card to execute a wireless operation in the transmission time gap; and generating a gap adjustment request according to the wireless operation executed by the second SIM card, and sending the gap adjustment request to the network, for enabling the network to adjust allocated transmission time gap according to the gap adjustment request.

Optionally, the wireless operation includes at least one of paging reception, random access, system information reception, reference signal measurement and cell search.

Optionally, based on the wireless operation being paging reception, said generating the gap adjustment request according to the wireless operation includes: generating, in response to a paging indicator received by the second SIM card indicating not receiving a secondary common control channel, the gap adjustment request to release a time gap allocated for receiving the secondary common control channel.

Optionally, said generating the gap adjustment request according to the wireless operation includes: generating, in response to detecting that the second SIM card needs message retransmission, the gap adjustment request to request the network to extend the transmission time gap.

Optionally, said generating the gap adjustment request according to the wireless operation includes: generating, in response to detecting that the second SIM card completes the wireless operation, the gap adjustment request to release the transmission time gap.

Optionally, said sending the gap adjustment request includes sending the gap adjustment request to the network using dedicated resources.

Optionally, the gap adjustment request is sent through physical layer resources or through MAC CE.

Optionally, the physical layer resources include PUCCH or PRACH or PUSCH or a combination of PRACH and PUSCH.

The embodiments of the present disclosure further provide a method for data transmission of a multi-card UE, which includes: allocating a transmission time gap for a first subscriber identity module (SIM) card according to a wireless operation demand of a second SIM card of a multi-card UE, for enabling the second SIM card to execute a wireless operation in the transmission time gap; and adjusting the allocated transmission time gap according to a gap adjustment request in response to receiving the gap adjustment request sent by the multi-card UE. The gap adjustment request is generated according to the wireless operation, the multi-card UE has at least the first SIM card and the second SIM card, and the first SIM card is in a connected status with a network.

Optionally, the wireless operation includes at least one of paging reception, random access, system information reception, reference signal measurement and cell search.

Optionally, based on the wireless operation being paging reception, said adjusting the allocated transmission time gap according to the gap adjustment request includes: releasing, in response to a paging indicator received by the second SIM card indicating not receiving a secondary common control channel, a time gap allocated for receiving the secondary common control channel.

Optionally, the method further includes: allocating dedicated resources for the first SIM card, so that the first SIM card sends the gap adjustment request using the dedicated resources.

Optionally, the gap adjustment request is sent through physical layer resources or through MAC CE.

Optionally, the physical layer resources include PUCCH or PRACH or PUSCH or a combination of PRACH and PUSCH.

The embodiments of the present disclosure further provide a device for data transmission of a multi-card UE. The multi-card UE has at least a first subscriber identity module (SIM) card and a second SIM card. The first SIM card is connected to a base station. The device includes: a gap requesting module, configured to determine a wireless operation demand of the second SIM card, and request a transmission time gap from the network according to the wireless operation demand, for enabling the second SIM card to execute a wireless operation in the transmission time gap; and a gap adjustment requesting module, configured to generate a gap adjustment request according to the wireless operation executed by the second SIM card, and send the gap adjustment request to the network, where the network adjusts allocated transmission time gap according to the gap adjustment request.

The embodiments of the present disclosure further provide a device for data transmission of a multi-card UE. The device includes: a gap allocating module, configured to allocate a transmission time gap for a first SIM card according to a wireless operation demand of a second SIM card of a multi-card UE, for enabling the second SIM card to execute a wireless operation in the transmission time gap; and a gap adjusting module, configured to adjust the allocated transmission time gap according to a gap adjustment request in response to receiving the gap adjustment request sent by the multi-card UE. The gap adjustment request is generated according to the wireless operation, the multi-card UE has at least the first SIM card and the second SIM card, and the first SIM card is in a connected status with a network.

The embodiments of the present disclosure further disclose a storage medium storing computer instruction, where the computer instructions, when being executed, perform the method for data transmission of a multi-card UE.

The embodiments of the present disclosure further disclose a user equipment, which includes the device, or includes a memory and a processor. The memory stores computer instructions executable by the processor, the processor is configured to perform the method for data transmission of a multi-card UE when running the computer instructions.

The embodiments of the present disclosure further disclose a base station, which includes the device, or includes a memory and a processor. The memory stores computer instructions executable by the processor, the processor is configured to perform the method for data transmission of a multi-card UE when running the computer instructions.

Compared with the prior art, the technical solutions of the embodiments of the present disclosure have the following beneficial effects.

In the technical solutions of the present disclosure, when the multi-card UE adopts the GAP method to solve the multi-card conflict, after the transmission time gap is applied by the multi-card UE from the network and is allocated by the network, the allocated transmission time gap can be rapidly adjusted through the instruction of the multi-card UE to improve the data transmission performance of the multi-card UE.

Furthermore, the wireless operation at least includes paging reception or random access. When the wireless operation is paging reception, if the multi-card UE does not need to receive SCCPCH, it can send a gap adjustment request to the network to inform the network that the GAP for receiving SCCPCH can be released, and then the network can continue to schedule the first SIM card after the GAP is withdrawn, so as to improve the utilization efficiency of the multi-card UE system.

Furthermore, the gap adjustment request can be used to extend the GAP allocated by the network or cancel all or part of the allocated GAP, so that the network side can flexibly configure the GAP according to the execution process and/or result of the wireless operation of the second SIM card and improve the utilization efficiency of the system.

Furthermore, the gap adjustment request can be sent in or outside the GAP. When the gap adjustment request is sent outside the GAP, the UE can use the existing resources or use the dedicated resources configured by the network to send the gap adjustment request. When the gap adjustment request is sent in the GAP, the network needs to indicate dedicated resources to be used for sending the gap adjustment request, while allocating the GAP for the UE.

BRIEF DESCRIPTION OF THE DRAWINGS

FIG. 6 Schematic diagram of GAP adjustment in a 2-step random access process according to an embodiment of the present disclosure;

FIG. 7 is a flowchart of another method for data transmission of a multi-card UE according to an embodiment of the present disclosure;

FIG. 10 to FIG. 15 are flow charts of methods for data transmission of a multi-card UE according to embodiments of the present disclosure, respectively.

DETAILED DESCRIPTION

As described in the background technology, when using the GAP solution to solve the multi-card conflict, there may be a problem of mismatch between applied GAP and the operation time of the SIM card performing a wireless operation, resulting in a waste of network resources and degrading the data transmission performance when the multi-card UE shares the communication baseband.

To solve this problem, a method for data transmission of a multi-card UE is provided according to embodiments in the present disclosure. The multi-card UE has at least a first SIM card and a second SIM card. The first SIM card is in a connected status with a network. The method includes: determining a wireless operation demand of the second SIM card, and requesting a transmission time gap from the network according to the wireless operation demand, for enabling the second SIM card to execute a wireless operation in the transmission time gap; and generating a gap adjustment request according to the wireless operation executed by the second SIM card, and sending the gap adjustment request to the network, for enabling the network to adjust allocated transmission time gap according to the gap adjustment request. In this way, the data transmission performance of the multi-card UE is improved.

In order to make the above purposes, features and advantages of the present disclosure more clear and easy to understand, some embodiments of the present disclosure are described in detail below in combination with the drawings.

Figure 1:
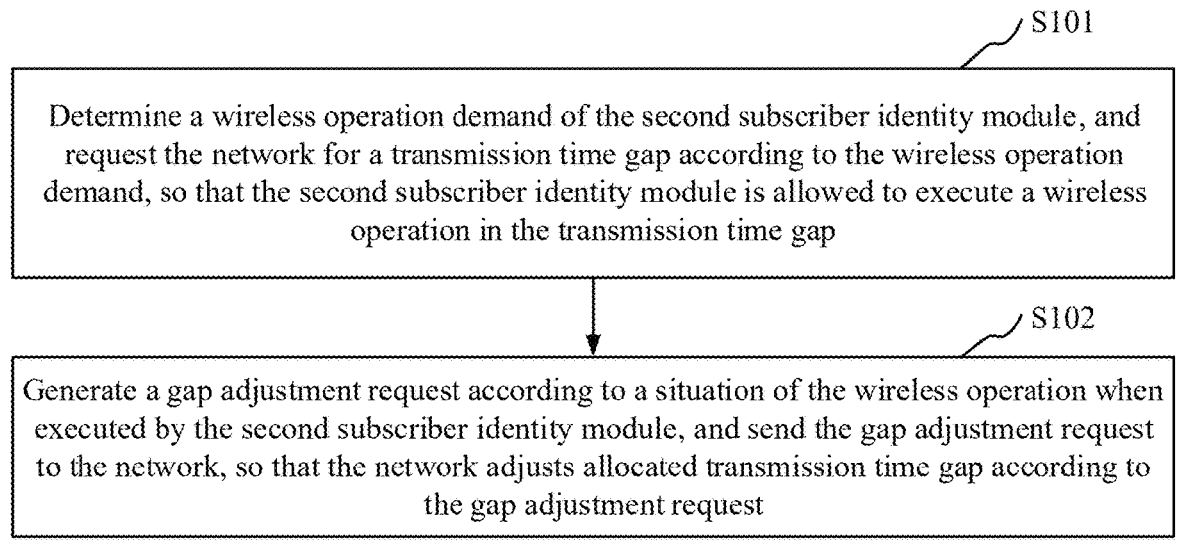
FIG. 1 is a flow chart of a method for data transmission of a multi-card UE according to an embodiment of the present disclosure.

FIG. 1 is a flowchart of a method for data transmission of a multi-card UE according to an embodiment of the present disclosure.

In this embodiment, the multi-card UE has at least a first SIM card and a second SIM card. It can be understood that the first SIM card may be a SIM card or USIM card of the multi-card UE, and the second SIM card is another SIM card or USIM card of the multi-card UE, which are not limited herein. The first SIM card is connected to the network.

Optionally, the first SIM card may access a corresponding serving base station and establish a connection with the serving base station. In this case, the first SIM card is connected to the network, and the second SIM card may also access a corresponding serving base station and establish a connection with the serving base station. The serving base station accessed by the first SIM card may be the same as or different from the serving base station accessed by the second SIM card.

The method for data transmission of a multi-card UE in this embodiment may be performed by the multi-card UE, that is, the multi-card UE performs the steps shown in FIG. 1. The method for data transmission of a multi-card UE may specifically include the following steps S101 and S102.

Step S101: Determine a wireless operation demand of the second SIM card and request a transmission time gap from the network according to the wireless operation demand, for enabling the second SIM card to execute a wireless operation in the transmission time gap.

Optionally, the wireless operation demand may include access to a network, paging reception, system information reception, reference signal measurement, and cell search. It should be noted that in the actual application environment, the wireless operation can also be any other service operation, which are not limited herein.

In the specific implementation of step S101, the multi-card UE may determine the wireless operation demand of the second SIM card. For example, the multi-card UE may determine that the second SIM card needs to perform paging reception. The multi-card UE may request the transmission time gap (GAP) from the network (or the base station side) accessed by the first SIM card, to be used by wireless operation of the second SIM card. Specifically, the transmission time gap may be a period of time including a time starting point and a time length.

In a specific implementation, a dual card UE may request the transmission time gap through RRC signaling. The transmission time gap may also be requested through a control element (CE) or Uplink Control Information (UCI) of the Medium Access Control (MAC) layer.

Correspondingly, the network (or base station) of the first SIM card may allocate a transmission time gap for the multi-card UE in response to the request of the multi-card UE. The second SIM card may use the transmission time gap to execute a wireless operation.

In other words, if the first SIM card and the second SIM card share a baseband, time-division multiplexing may be performed on the baseband, so that the wireless operation of the second SIM card is performed at the transmission time gap and the data transmission of the first SIM card in the connected state is performed at other times.

Step S102: Generate a gap adjustment request according to the wireless operation executed by the second SIM card, and send the gap adjustment request to the network, for enabling the network to adjust allocated transmission time gap according to the gap adjustment request.

The transmission time gap allocated to the first SIM card by the network side should correspond to the time reserved for the second SIM card to execute a wireless operation. To ensure that the wireless operation can be completed, a long GAP may be applied.

When the second SIM card performs the wireless operation in the transmission time gap, if the multi-card UE detects that the wireless operation performed by the second SIM card is completed before the GAP ends so that the remaining reserved time is no longer required, or if the execution fails so that the remaining reserved time is not sufficient for completing the wireless operation and therefore a longer time is required, the multi-card UE may send a gap adjustment request to the network (or the base station side) to adjust the applied transmission time gap without waiting for the end of the transmission time gap.

Optionally, the gap adjustment request may request the network (or base station side) to release the remaining GAP or extend the time of the GAP.

The gap adjustment request may be generated according to the intermediate process of the wireless operation performed by the second SIM card, or according to the execution result.

Optionally, during the implementation of steps S101 and S102, the second SIM card is always in a non-connected state with the network and only receives data sent by the network.

Optionally, the gap adjustment request is sent through physical layer resources or through a control element (CE) of a Medium Access Control (MAC) layer.

Optionally, the gap adjustment request is sent through MAC layer resources. That is, a new MAC CE can be defined, and the UE sends the newly defined MAC CE to notify the network (or the base station side).

Optionally, the physical layer resources include PUCCH, or PRACH, or PUSCH, or a combination of PRACH and PUSCH.

The physical layer resources may be a specific physical uplink control channel (PUCCH) or a specific physical random access channel (PRACH). PRACH may be time-frequency domain resources for transmission of a preamble or a physical random access channel, namely RACH Occasion (RO). The physical layer resources may alternatively be only a physical uplink shared channel (PUSCH), or a combination of PRACH and PUSCH.

Preferably, the PUCCH may be transmitted through physical layer resources, because the feedback speed in this way is generally the highest.

Through the above method for data transmission of a multi-card UE, when the multi-card UE adopts the GAP method to solve the multi-card conflict, the allocated transmission time gap can be quickly adjusted according to the instruction of the multi-card UE after the transmission time gap is applied by the multi-card UE and allocated by the network, so as to improve the data transmission performance of the multi-card UE. The method for data transmission of a multi-card UE shown in FIG. 1 is executed by the UE side.

Optionally, the wireless operation includes at least one of paging reception, random access, system information reception, reference signal measurement and cell search.

In an embodiment, when the wireless operation is paging reception, referring to FIG. 1, step S102 of generating a gap adjustment request according to the wireless operation includes: step S102_1 of generating, in response to a paging indicator received by the second SIM card indicating not receiving a secondary common control channel, the gap adjustment request to release a time gap allocated for receiving the secondary common control channel (refer to FIG. 10).

Figure 2:
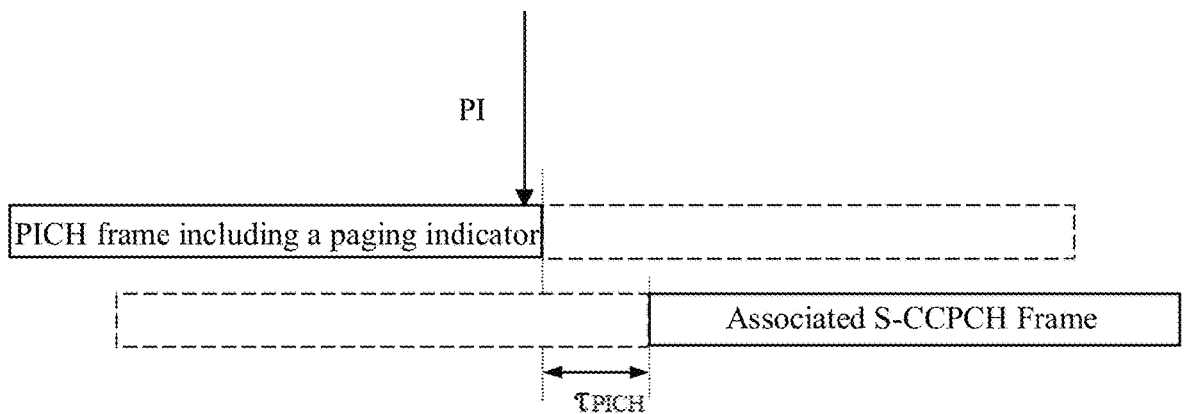
FIG. 2 is a schematic diagram of UE paging reception in the conventional technology.

For the case that the wireless operation is paging reception, in a specific application scenario, the second SIM card uses the Wideband Code Division Multiple Access (WCDMA) technology, the first SIM card is in the Long Term Evolution (LTE) mode or a New Radio (NR) mode, SIM1 is in the connected state, and SIM2 needs to perform paging reception. The multi-card UE requests the network to allocate the transmission time gap for the paging reception of the second SIM card. Reference is made to FIG. 2, which is a schematic diagram of UE paging reception in the conventional technology. For WCDMA paging, the UE receives the paging indicator channel (PICH) including a paging indicator (PI), as "PICH frame including a paging indicator" shown in FIG. 2 and receives an associated secondary common control physical channel (SCCPCH or S-CCPCH) according to the PI, as "Associated S-CCPCH Frame" shown in FIG. 2. The UE receives the PI at a fixed position. However, after the PI is received, there may be insufficient time to request the GAP for receiving SCCPCH. In an extreme case, there is only a delay of 2 ms (as shown in FIG. 2). If the first SIM card applies for the GAP in advance, the SCCPCH may not be received in most cases, resulting in a waste of receiving opportunities.

For the GAP applied for receiving PICH and S-CCPCH of WCDMA, if the PI is at the end of PICH, the interval between the end of PICH and receiving SCCPCH is only 2 ms, which may be too late to apply for a GAP. The solution is to allocate a GAP for receiving PI plus a long GAP (for example, 10 ms) each time. In this instance, if the network allocates the GAP for receiving the PI plus a long GAP each time, the multi-card UE can detect the PI corresponding to the UE in the PICH. If the multi-card UE finds that it does not need to receive the SCCPCH, it sends a gap adjustment request to the network to notify the network to release the GAP allocated for receiving the SCCPCH. Then the network continues to schedule the first SIM card after recycling the GAP.

Figure 3:
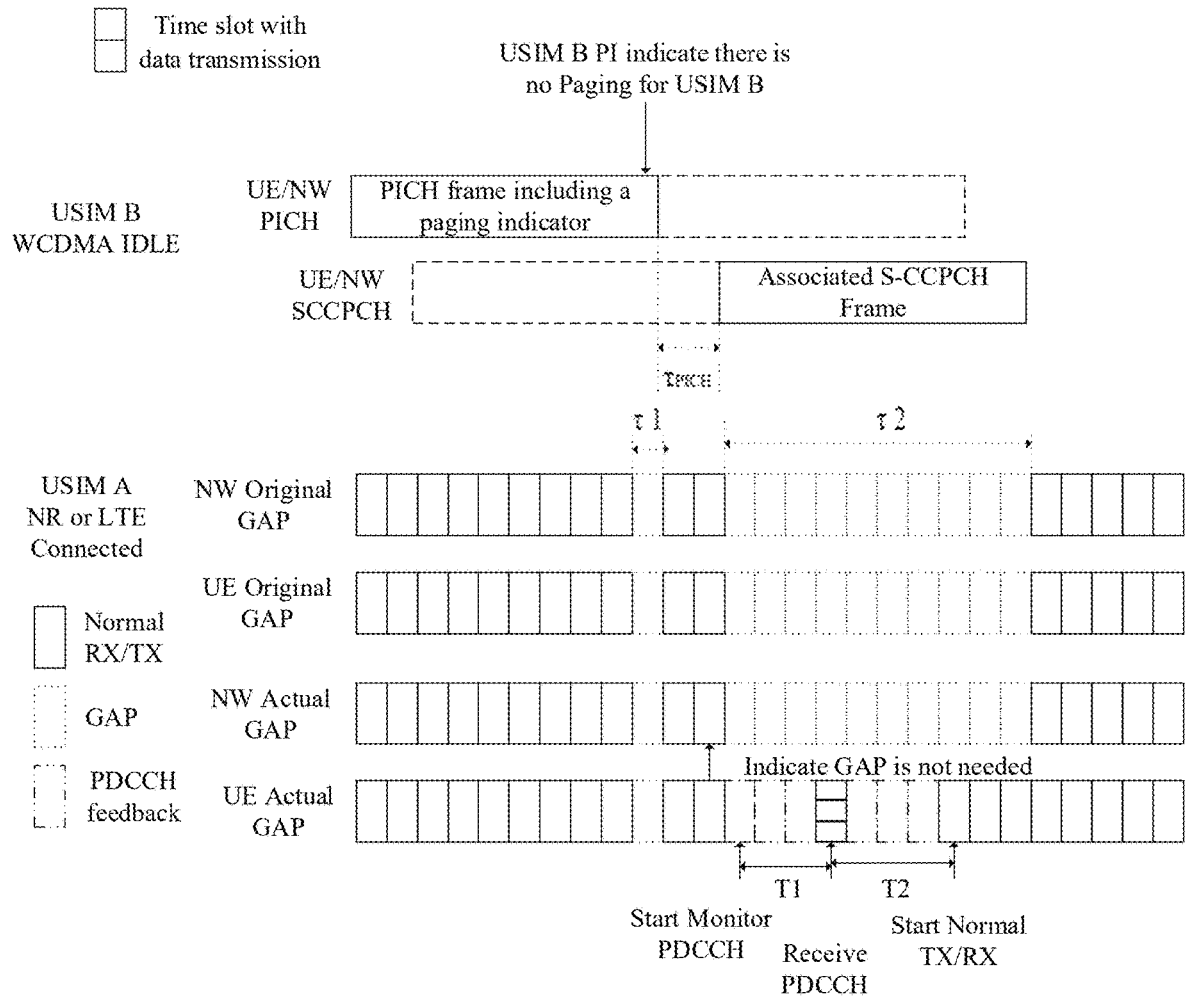
FIG. 3 is a schematic diagram of GAP adjustment in paging reception according to an embodiment of the present disclosure.

Specifically, reference is made to FIG. 2 and FIG. 3. FIG. 3 provides a schematic diagram of GAP adjustment in paging reception according to an embodiment of the present disclosure. In this case, the network side allocates, for the first SIM card, a GAP (as shown in FIG. 3) for receiving PI and a long GAP (as shown in FIG. 3).

The solution in FIG. 3 improves the paging reception in FIG. 2. The multi-card UE has a first subscriber identity module USIM A and a second subscriber identity module USIM B, where USIM A operates in the NR or LTE mode, and is connected to the network (as "USIM A NR or LTE Connected" shown in FIG. 3), and USIM B is in the idle state (IDLE) of WCDMA (as "USIM B WCDMA IDLE" shown in FIG. 3).

In the PICH frame including a paging indicator received by USIM B, it is indicated to not receive the relevant S-CCPCH (as "USIM B PI indicates there is no Paging for USIM B" shown in FIG. 3). If the multi-card UE does not send the gap adjustment request to the network, the original GAP on the network side (as "NW Original GAP" shown in. FIG. 3) corresponds to the original GAP of USIM A (as "UE Original GAP" shown in FIG. 3), and the time domain frame occupied by data transmission of USIM A is the Normal RX/TX area as shown in the figure.

When the multi-card UE detects that USIM B does not receive the S-CCPCH, USIM A sends a gap adjustment request to the network (as "Indicate GAP is not needed" shown in FIG. 3). At this time, the gap adjustment request is between the GAP for receiving the PI (as shown in FIG. 3) and the long GAP (as shown in FIG. 3), that is, outside the GAP. The network side (NW) cancels the GAP for the S-CCPCH according to the gap adjustment request.

Since the multi-card UE cannot determine whether the network side accurately receives the gap adjustment request and whether the cancellation of the GAP for the S-CCPCH is successful, the multi-card UE monitors the physical downlink control channel (PDCCH), as "Start Monitoring PDCCH" shown in FIG. 3.

When receiving the PDCCH from the network that indicates the GAP adjustment is successful (as "Receive PDCCH" shown in FIG. 3), USIM A can execute data transmission, as "Start Normal TX/RX" shown in FIG. 3. At this time, the time of the GAP adjustment by the gap adjustment request may be represented as T1 and T2 in FIG. 3. The actual GAP on the network side (as "NW Actual GAP" shown in FIG. 3) and the actual GAP on the USIM A (as "UE Actual GAP" shown in FIG. 3) change as shown in FIG. 3.

Figure 4:
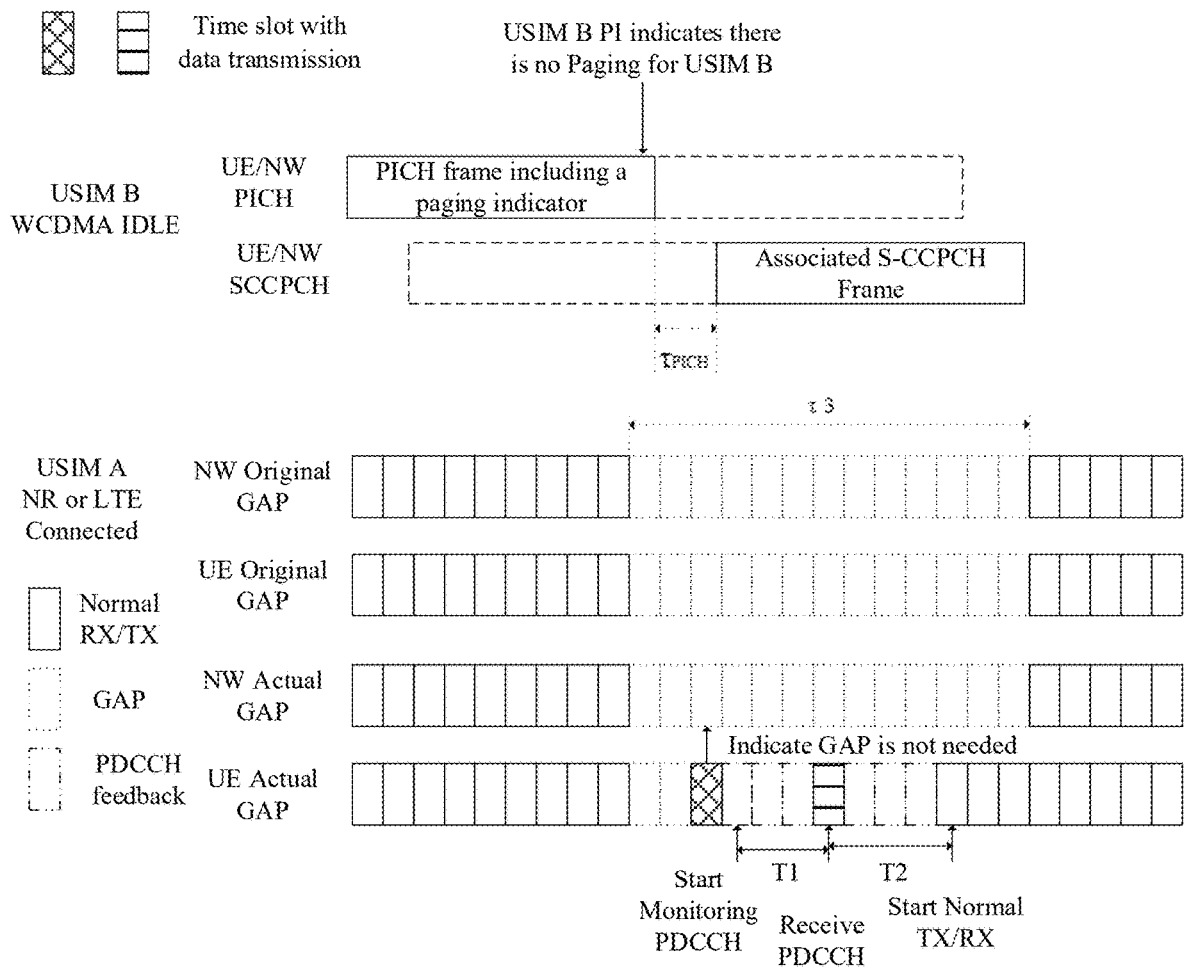
FIG. 4 is a schematic diagram of GAP adjustment in paging reception according to another embodiment of the present disclosure.

Reference is made to FIG. 2 and FIG. 4. FIG. 4 provides a schematic diagram of another GAP adjustment in paging reception according to an embodiment of the present disclosure. In this case, the network side allocates a long GAP for the first SIM card to receive the PI and the S-CCPCH corresponding to the PI (as shown in FIG. 4). The UE sends the gap adjustment request (as "Indicate GAP is not needed" shown in FIG. 4) by the steps as shown in FIG. 3. At this time, the gap adjustment request is in the GAP for receiving the PI and the S-CCPCH corresponding to the PI, that is, in the GAP.

Optionally, in some cases that the multi-card UE may be unable to finish the adjustment in time through RRC signaling, the multi-card UE may quickly make the adjustment through signaling in the MAC layer or physical layer.

Through the above embodiment, when the wireless operation is paging reception, if the multi-card UE does not need to receive the SCCPCH, the multi-card UE may send a gap adjustment request to the network to inform the network that the GAP for receiving the SCCPCH can be released. Then the network continues to schedule the first SIM card after the GAP is recycled, so as to improve the utilization efficiency of the multi-card UE system.

In the case that the wireless operation is random access (RA), for example, when a subscriber identity module in the dual sim dual standby (DSDS) time division multiplex (TDM) scheme performs RA, the requested GAP is no longer needed, and a new GAP needs to be applied because of the RA result (successful or failed access). In this case, the UE may not enter the connected state after the RA. For example, on demand service information (SI) will require RA.

Alternatively, in the DSDS TDM scheme, a subscriber identity module performs the RA, and an applied GAP is required to be used to prompt the base station to adjust the GAP because of the RA result (the GAP is terminated before the GAP ends in the case of success of the RA, or a longer GAP is required in the case of failure of the RA).

In the above case, if the GAP allocation can be adjusted quickly, unnecessary GAP waiting can be avoided. By using these time slices to perform system transmission, the system performance can be improved.

Figure 5:
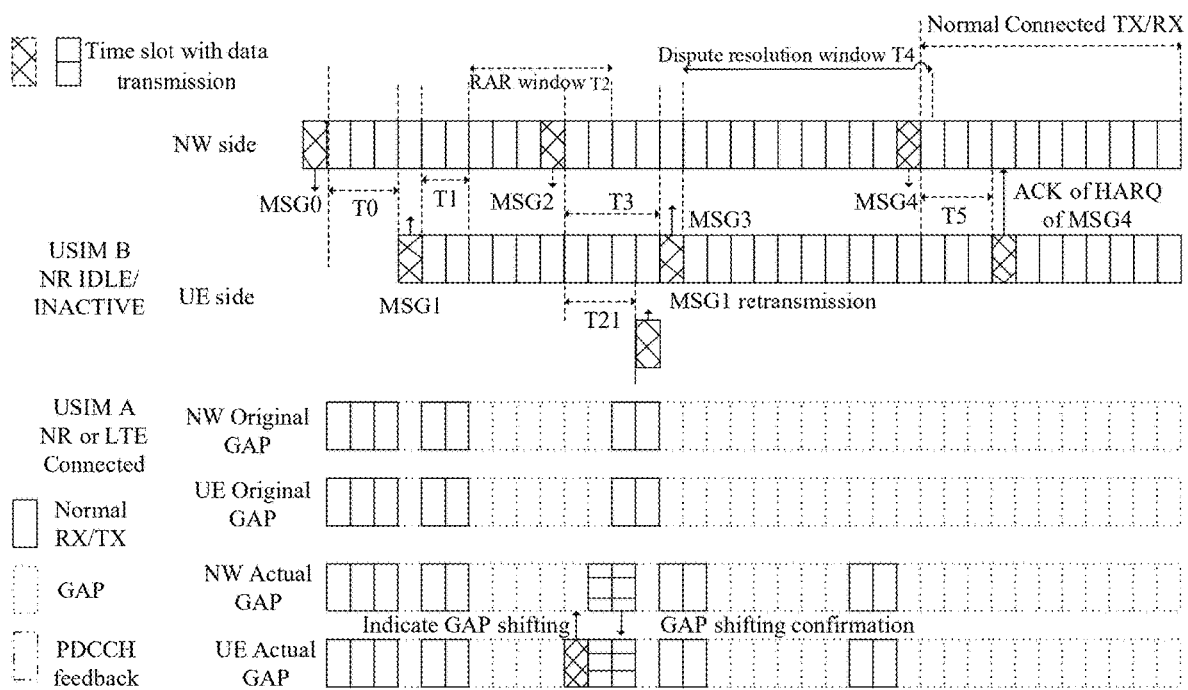
FIG. 5 is a schematic diagram of GAP adjustment in a 4-step random access process according to an embodiment of the present disclosure.

FIG. 5 provides a schematic diagram of GAP adjustment in a 4-step random access process according to an embodiment of the present disclosure.

Specifically, the multi-card UE has a first subscriber identity module USIM A and a second subscriber identity module USIM B, where USIM A and USIM B operate in the NR or LTE mode, and are connected to the network (NW) (as "USIM A NR or LTE Connected" shown in FIG. 5), and USIM B is in the idle state (IDLE) or inactive state (INACTIVE) (as "USIM B NR IDLE/INACTIVE" as shown in FIG. 5).

The network allocates the GAP to USIM A so that USIM B performs the 4-step RA in the GAP, which includes the transmission confirmation (ACK/NACK) of the hybrid automatic repeat reQuest (HARQ) of MSG0, MSG1, MSG2, MSG3, MSG4 and MSG4 in FIG. 5, where ACK is a confirmation response or a confirmation character, and NACK is a negative response.

The GAP includes a time window T0, a time window T1, a random access response (RAR) window T2, a random access response window T3, a dispute resolution window T4, and a dispute resolution window T5 of the 4-step RA.

When USIM B receives MSG4 from NW, the random access is successful, and normal data transmission can be performed, as "Normal Connected TX/RX" shown in FIG. 5. In the case that the UE does not perform GAP adjustment, GAPs on UE and NW side are as "UE Original GAP" and "NW Original GAP" shown in FIG. 5.

In the case that the UE adopts the method for data transmission of a multi-card UE according to the present disclosure to adjust the GAP, if MSG1 transmission fails, the UE initiates MSG1 retransmission. At this point, USIM A sends a gap adjustment request to NW ("Indicate GAP shifting").

When NW confirms the GAP adjustment, NW replies to UE an adjustment confirmation ("GAP shifting confirmation").

Optionally, the 4-step RA process is an existing RA process.

In the RACH process of NR, the windows for receiving MSG2 (ra-ResponseWindow, maximumly 10 ms) and MSG4 (ra-ContentionResolution Timer, maximumly 64 ms) are both long. If a 4-step RACH process is divided into four GAPs, the interval between them is actually very short, so it is more feasible to apply for a long GAP, which may be close to 100 ms. Apparently, it is also feasible to divide the 4-step RACH process into four GAP applications. However, both cases will lead to a large waste of GAP time when the RACH succeeds before the GAP ends or when the RACH fails, and another GAP needs to be applied.

Optionally, when the UE finds that USIM B needs retransmission (for example, as "MSG1 retransmission" shown in FIG. 5), USIM A timely notifies the serving network to shift the previously applied GAP backward by N slots/subframes, so as to improve the data flow of USIM A by using transmission interval of USIM B as much as possible. At the same time, by shifting the GAP backward, the success rate of the RA process of USIM B can also be improved. If USIM A applies for a long GAP and the RA is not successful at the end of the GAP, the access will fail. When the GAP can be shifted backward flexibly, the success rate of random access may also increase.

As shown in FIG. 5, when the multi-card UE finds that USIM B needs retransmission, USIM B timely notifies the serving network to shift the previously applied GAP backward by N slots/subframes, so as to increase the data flow of USIM B by using transmission interval of USIM A as much as possible. At the same time, by shifting the GAP backward, the success rate of the RA process of USIM A can also be improved. If USIM A applies for a long GAP and the RA is not successful at the end of the GAP, the access will fail. When the GAP can be shifted backward flexibly, the success rate of the random access may also increase.

FIG. 6 provides a schematic diagram of GAP adjustment in a 2-step random access process according to an embodiment of the present disclosure.

Specifically, the configurations of USIM A and USIM B of the multi-card UE are the same as those in FIG. 5, and USIM B can execute the 2-step RA in the allocated GAP (corresponding to MSG0, MSG1 and MSG2 in FIG. 6, the GAP includes time window T0, time window T1, and random access response (RAR) window T2 of the 2-step RA).

When performing On Demand SI or Contention-Free Random Access (CFRA) of MSG1, the conflict resolution process of MSG 3 and MSG 4 is not required. Therefore, when USIM B receives the RAR early in the RAR receiving window and verifies that the random access is successful, USIM A may notify the network that the subsequent GAP is no longer needed. That is, the UE sends a gap adjustment request to NW, indicating that the remaining GAP can be canceled (as shown in FIG. 6) and starts monitoring the response from the network. When confirming the cancellation, the network returns to the UE the confirming message of cancelling the remaining GAP.

In addition, when the wireless operation is system information reception, reference signal measurement and cell search, the UE may determine whether to generate a gap adjustment request and send the gap adjustment request to the network according to whether the system information is received successfully, the time of receiving, whether the reference signal measurement is successful, the time of completing measurement, the result of cell search and the like. For example, when the system information is not received in the requested GAP, the UE may send a gap adjustment request to the network to extend the GAP. When the system information is received in advance, the UE may send a gap adjustment request to the network to release the remaining GAP.

It should be noted that the GAP in FIG. 3 to FIG. 6 includes time slots for data transmission. The time slots on the UE side corresponds to the time slots on the network side according to the time sequence.

In an embodiment, referring to FIG. 1, step S102 of generating a gap adjustment request according to the wireless operation may include: step S102_2 of generating, in response to detecting that the second SIM card needs message retransmission, the gap adjustment request to request the network to extend the transmission time gap (refer to FIG. 11).

When the second SIM card performs wireless operation, if message retransmission is required, the multi-card UE may send a gap adjustment request to the connected network through the first SIM card to extend the data transmission time gap allocated by the network, so as to ensure the success of wireless operation. Optionally, referring to the case where USIM B retransmits MSG1 in FIG. 4, UE may extend the GAP to improve the success rate of the RA process of USIM B.

Figure 12:

In another embodiment, the step S102 of generating a gap adjustment request according to the wireless operation may include: step S102_3 of generating, in response to detecting that the second SIM card completes the wireless operation early, the gap adjustment request to release remaining transmission time gap (refer to FIG. 12).

When the second SIM card performs the wireless operation, if the wireless operation ends earlier than the estimated time, the multi-card UE may send a gap adjustment request to the connected network through the first SIM card, to cancel the remaining part of the allocated data transmission time gap of the network, that is, the part that has not been occupied. After being released, the remaining part of the GAP can be used by the first SIM card in the connected state, which effectively improves the utilization efficiency of the system.

Optionally, referring to the case that USIM B completes random access through the 2-step RA in FIG. 6, the UE requests the network to cancel the remaining GAP, thereby fully using the resources of UE.

Figure 13:

In an embodiment, referring to FIG. 1, the step S102 of sending the gap adjustment request to the network may include step S102_4 of sending the gap adjustment request to the network using dedicated resources (refer to FIG. 13).

The multi-card UE may send the gap adjustment request to the network either in the GAP (see FIG. 4) or outside the GAP (see FIG. 3). In actual implementations, the GAP allocated by the network to the UE may be a long GAP or a series of GAPs with different lengths. When the UE sends a gap adjustment request through the first SIM card to the network outside the GAP, the UE may use existing resource applying and scheduling mechanism to send the gap adjustment request. Alternatively, the network may configure dedicated resources for the first SIM card, so that the UE can use the dedicated resource to send the gap adjustment request. When the UE sends the gap adjustment request to the network through the first SIM card in the GAP, the network may reserve dedicated resources for the first SIM card while allocating a GAP for the second SIM card to execute a wireless operation, and the first SIM card may send the gap adjustment request to the network side using the reserved dedicated resources.

Optionally, the dedicated resources may be time domain resources and/or frequency domain resources, and further may be a small amount of resource blocks spaced in the time domain and/or frequency domain.

Optionally, the dedicated resources may be code domain resources. For example, orthogonal codes are used to distinguish the dedicated resources in the time domain and/or frequency domain for different UEs, so that multiple UEs can share the same dedicated resources.

With the above embodiment, the gap adjustment request may be sent in or outside the GAP. When the gap adjustment request is sent outside the GAP, the UE may use existing resources, or the dedicated resources allocated by the network to send the gap adjustment request. When the gap adjustment request is sent in the GAP, the network needs to indicate dedicated resources for the UE to send the gap adjustment request, while allocating the GAP.

Another method for data transmission of a multi-card UE is further provided according to an embodiment of the present disclosure. Referring to FIG. 7, the method includes steps S701 and S702.

Step S701: Allocate a transmission time gap for a first SIM card according to a wireless operation demand of a second SIM card of a multi-card UE, for enabling the second SIM card to execute a wireless operation in the transmission time gap.

Step S702: Adjust the allocated transmission time gap according to a gap adjustment request in response to receiving the gap adjustment request sent by the multi-card UE.

The gap adjustment request is generated according to the wireless operation, the multi-card UE has at least the first SIM card and the second SIM card, and the first SIM card is in a connected status with a network.

Optionally, the wireless operation includes at least one of paging reception, random access, system information reception, reference signal measurement and cell search.

Figure 14:

In an embodiment, when the wireless operation is paging reception, the step S702 of adjusting the allocated transmission time gap according to the gap adjustment request includes: step S702_1 of releasing, in response to a paging indicator received by the second SIM card indicating not receiving a secondary common control channel, a time gap allocated for receiving the secondary common control channel (refer to FIG. 14).

Figure 15:

In an embodiment, the method described in FIG. 7 further includes: step S702_2 of allocating dedicated resources for the first SIM card, so that the first SIM card sends the gap adjustment request using the dedicated resources (refer to FIG. 15).

In one embodiment, the gap adjustment request is sent through physical layer resources or through MAC CE.

Optionally, the physical layer resources include PUCCH, or PRACH, or PUSCH, or a combination of PRACH and PUSCH.

For more information about the method for data transmission of a multi-card UE in FIG. 7, reference may be made to the relevant description of the network (or base station) side in FIG. 1 to FIG. 6, which will not be repeated here.

It should be noted that the sequence number of each step in this embodiment does not constitute limitations on the execution order of the steps.

Figure 8:
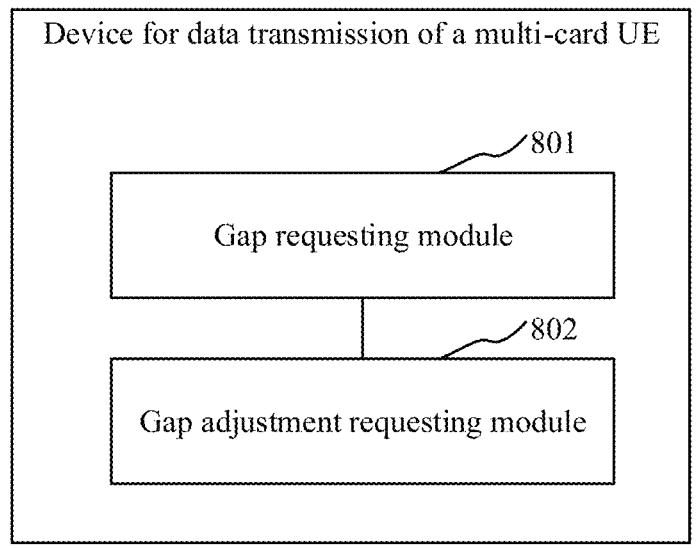
FIG. 8 is a structural diagram of a device for data transmission of a multi-card UE according to an embodiment of the present disclosure.

A device for data transmission of a multi-card UE is provided according to an embodiment of the present disclosure. Referring to FIG. 8, the multi-card UE has at least a first SIM card and a second SIM card. The first SIM card is connected to the base station. The device includes a gap requesting module 801 and a gap adjustment requesting module 802.

The gap requesting module 801 is configured to determine a wireless operation demand of the second SIM card and request a transmission time gap from the network according to the wireless operation demand, for enabling the second SIM card to execute a wireless operation in the transmission time gap.

The gap adjustment request module 802 is configured to generate a gap adjustment request according to the wireless operation executed by the second SIM card, and send the gap adjustment request to the network, where the network adjusts allocated transmission time gap according to the gap adjustment request.

For more information about the device for data transmission of a multi-card UE described in FIG. 8, reference may be made to the relevant description of the method for data transmission of a multi-card UE in FIG. 1, which will not be repeated here.

In specific implementations, the device for data transmission of a multi-card UE may correspond to a chip having a multi-card UE data transmission function in the user equipment, or correspond to a chip having a data processing function, such as a System On a Chip (SOC), a baseband chip, or the like, or correspond to a chip module including the chip having the multi-card UE data transmission function in the user equipment, or correspond to a chip module including the chip having the data processing function, or correspond to the user equipment.

Figure 9:
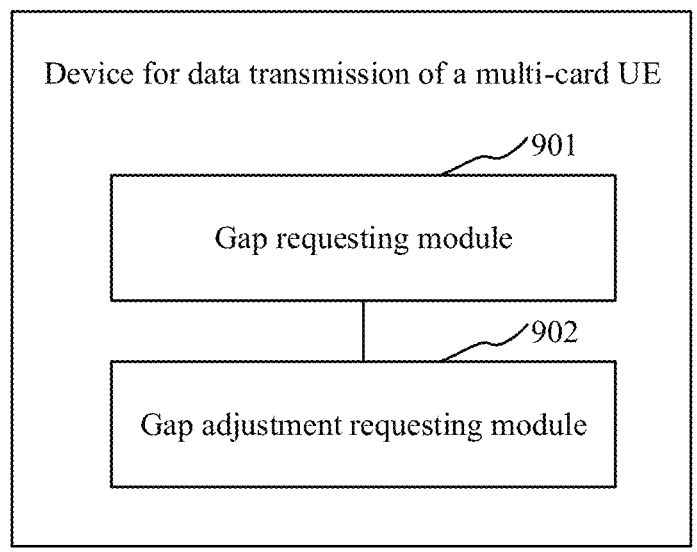
FIG. 9 is a structural diagram of another device for data transmission of a multi-card UE according to an embodiment of the present disclosure.

Another device for data transmission of a multi-card UE is provided according to an embodiment of the present disclosure. Referring to FIG. 9, the device includes a gap allocation module 901 and a gap adjustment module 902.

The gap allocation module 901 is configured to allocate a transmission time gap for a first SIM card according to a wireless operation demand of a second SIM card of a multi-card UE, for enabling the second SIM card to execute a wireless operation in the transmission time gap.

The gap adjustment module 902 is configured to adjust the allocated transmission time gap according to a gap adjustment request in response to receiving the gap adjustment request sent by the multi-card UE.

The gap adjustment request is generated according to the wireless operation, the multi-card UE has at least the first SIM card and the second SIM card, and the first SIM card is in a connected status with a network.

For more information about the device for data transmission of a multi-card UE described in FIG. 9, reference may be made to the relevant description of the method for data transmission of a multi-card UE in FIG. 7, which will not be repeated here.

In specific implementations, the device for data transmission of a multi-card UE may correspond to a chip having a multi-card UE data transmission function in the base station, or correspond to a chip having a data processing function, such as a System On a Chip (SOC), a baseband chip, or the like, or correspond to a chip module including the chip having the multi-card UE data transmission function in the base station, or correspond to a chip module including the chip having the data processing function, or correspond to the base station.

In specific implementations, each module/unit included in each device and product described in the above embodiments may be a software module/unit, or a hardware module/unit, or may be partially a software module/unit and partially a hardware module/unit.

For example, for each device and product applied to or integrated in the chip, each module/unit contained therein may be implemented in the way of hardware such as a circuit, or at least some modules/units may be implemented in the way of software program. The software program runs on a processor integrated in the chip, and the remaining (if any) modules/units may be implemented in the way of hardware, such as a circuit. For each device and product applied to or integrated in the chip module, each module/unit thereof may be implemented in the way of hardware such as a circuit, and different modules/units may be located in the same component (such as a chip, a circuit module, etc.) or different components of the chip module, or at least some modules/units may be implemented in the way of software program, which runs on the processor integrated in the chip module. The remaining (if any) modules/units may be realized by hardware such as a circuit. For each device and product applied to or integrated in the terminal, each module/unit contained therein may be implemented in the way of hardware such as a circuit, and different modules/units may be located in the same component (such as chip, circuit module, etc.) or different components in the terminal, or at least some modules/units may be implemented in the way of software program. The software program runs on the processor integrated in the terminal. The remaining (if any) modules/units may be realized by hardware such as a circuit.

A storage medium storing computer instruction is provided according to an embodiment of the present disclosure. When the computer instructions are executed, the method for data transmission of a multi-card UE as shown in FIG. 1 is performed. The storage medium may include a ROM, RAM, disk or optical disc, etc. The storage medium may also include a non-volatile memory or a no-transitory memory.

A user equipment is provided according to an embodiment of the present disclosure, which may include the device, or include a memory and a processor. The memory stores computer instructions executable by the processor. When the processor runs the computer instruction, the processor executes the method for data transmission of a multi-card UE as shown in FIG. 1. The user equipment includes but is not limited to a mobile phone, a computer, a tablet, and other terminal device.

A base station is provided according to an embodiment of the present disclosure, which may include the device, or include a memory and a processor. The memory stores computer instructions executable by the processor. When the processor runs the computer instruction, the processor executes the method for data transmission of a multi-card UE as shown in FIG. 7.

It is noted that the technical solution of the present disclosure can be applied to a 5G (5th Generation) communication system, as well as various new communication systems in the future, such as 6G and 7G.

Specifically, in the embodiment of the present disclosure, the processor may be a central processing unit (CPU), or another general-purpose processor, a digital signal processor (DSP), an application specific integrated circuit (ASIC), a Field programmable gate array (FPGA), or other programmable logic device, discrete gate, transistor logic device or discrete hardware component. A general-purpose processor may be a microprocessor or any conventional processor.

It should also be understood that the memory in the embodiments of the present application may be a volatile memory or non-volatile memory or may include both volatile and non-volatile memories. The nonvolatile memory may be a read only memory (ROM), a programmable ROM (PROM), an erasable PROM (EPROM), an electrically erasable EPROM (EEPROM) or a flash memory. The volatile memory may be a random access memory (RAM), which is used as external cache. By way of illustration but not limitation, many forms of random access memory (RAM) can be used, such as a static RAM (SRAM), a dynamic random access memory (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM).

Specifically, the terminal in the embodiment of the application includes various forms of user equipment (UE), access terminal, user unit, user station, mobile terminal, mobile station (MS), remote station, remote terminal, mobile device, user terminal, terminal equipment, wireless communication equipment, user agent or user device. The terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, an on-board device, a wearable device, a terminal equipment in the future 5G network or a terminal equipment in the future evolved Public Land Mobile Network (PLMN), which is not limited herein.

It should be understood that the used term "and/or" describes an association relationship between associated objects, which indicates including three kinds of relationships. For example, A and/or B indicates three cases: A alone, A and B together, and B alone. In addition, the character "/" indicates the "or" relationship.

The term "multiple" in the present disclosure refers to two or more.

The terms "first" and "second" in the present disclosure are only used to illustrate and distinguish the description objects, which do not indicate the order and do not indicate the special limitation on the number of devices in the embodiments of the present disclosure, and do not constitute any limitation on the embodiments in the present disclosure.

The term "connection" in the embodiments of the present disclosure refers to various connection methods such as direct connection or indirect connection used to achieve communication between devices, which is not limited herein.

Although the technical solution is disclosed as above, the technical solutions is not limited thereto. Any person skilled in the art can make various changes and modifications without departing from the spirit and scope of the present disclosure. Therefore, the scope of protection shall be subject to the scope defined in the claims.

A base station is provided according to an embodiment of the present disclosure, which includes a memory and a processor. The memory stores computer instructions executable by the processor. When the processor runs the computer instructions, the processor executes the method as shown in FIG. 13.

The base station (BS) in the embodiments is also known as base station equipment, which is a device deployed in the wireless access network (RAN) to provide wireless communication functions. For example, the equipment providing the base station function in a 2G network includes a base transceiver station (BTS), the equipment providing the base station function in a 3G network includes a NodeB, the equipment providing the base station function in a 4G network includes an evolved NodeB (eNB), the equipment providing the base station function in a wireless local area network (WLAN) includes an access point (AP), the equipment providing the base station function in a 5G new radio (NR) includes a gNB and a next generation node B (ng eNB). The gNB uses the NR technology for communication with a terminal, and the ng eNB uses the E-UTRA (Evolved Universal Territorial Radio Access) technology for communication with a terminal. Both gNB and ng eNB can be connected to a 5G core network. The base station in the present disclosure also includes the equipment that provides the base station function in any future communication systems.

The base station controller in the embodiments of the present disclosure is a device for managing a base station, such as a base station controller (BSC) in a 2G network, a radio network controller (RNC) in a 3G network, and a device for controlling and managing a base station in a future communication system.

The network side in the embodiments of the present disclosure refers to the communication network providing communication services for terminals, including the base station of the wireless access network, the base station controller of the wireless access network, and any equipment on the core network side.

Although the technical solution is disclosed as above, the technical solutions is not limited thereto. Any person skilled in the art can make various changes and modifications without departing from the spirit and scope of the present disclosure. Therefore, the scope of protection shall be subject to the scope defined in the claims.

The invention claimed is:

1. A method for data transmission of a multi-card UE, wherein the multi-card UE has at least a first subscriber identity module (SIM) card and a second SIM card, the first SIM card is in a connected status with a network, the method comprises:
   determining a wireless operation demand of the second SIM card, and requesting a transmission time gap from the network according to the wireless operation demand, for enabling the second SIM card to execute a wireless operation in the transmission time gap; and
   generating a gap adjustment request according to the wireless operation executed by the second SIM card, and sending the gap adjustment request to the network, for enabling the network to adjust allocated transmission time gap according to the gap adjustment request.

2. The method according to claim 1, wherein the wireless operation comprises at least one of paging reception, random access, system information reception, reference signal measurement and cell search.

3. The method according to claim 2, wherein based on the wireless operation being paging reception, said generating the gap adjustment request according to the wireless operation comprises:

generating, in response to a paging indicator received by the second SIM card indicating not receiving a secondary common control channel, the gap adjustment request to release a time gap allocated for receiving the secondary common control channel.

4. The method according to claim 1, wherein said generating the gap adjustment request according to the wireless operation comprises:
generating, in response to detecting that the second SIM card needs message retransmission, the gap adjustment request to request the network to extend the transmission time gap.

5. The method according to claim 1, wherein said generating the gap adjustment request according to the wireless operation comprises:
generating, in response to detecting that the second SIM card completes the wireless operation early, the gap adjustment request to release remaining transmission time gap.

6. The method according to claim 1, wherein said sending the gap adjustment request comprises:
sending the gap adjustment request to the network using dedicated resources.

7. The method according to claim 1, wherein the gap adjustment request is sent through physical layer resources or through MAC CE.

8. The method according to claim 7, wherein the physical layer resources comprise:
PUCCH, or
PRACH, or
PUSCH, or
a combination of PRACH and PUSCH.

9. A method for data transmission of a multi-card UE, comprising:
allocating a transmission time gap for a first subscriber identity module (SIM) card according to a wireless operation demand of a second SIM card of a multi-card UE, for enabling the second SIM card to execute a wireless operation in the transmission time gap; and
adjusting the allocated transmission time gap according to a gap adjustment request in response to receiving the gap adjustment request sent by the multi-card UE;
wherein the gap adjustment request is generated according to the wireless operation, the multi-card UE has at least the first SIM card and the second SIM card, and the first SIM card is in a connected status with a network.

10. The method according to claim 9, wherein the wireless operation comprises at least one of paging reception, random access, system information reception, reference signal measurement and cell search.

11. The method according to claim 10, wherein based on the wireless operation being paging reception, said adjusting the allocated transmission time gap according to the gap adjustment request comprises:
releasing, in response to a paging indicator received by the second SIM card indicating not receiving a secondary common control channel, a time gap allocated for receiving the secondary common control channel.

12. The method according to claim 9, further comprising:
allocating dedicated resources for the first SIM card, so that the first SIM card sends the gap adjustment request using the dedicated resources.

13. The method according to claim 9, wherein the gap adjustment request is sent through physical layer resources or through MAC CE.

14. The method according to claim 13, wherein the physical layer resource comprises:
PUCCH, or
PRACH, or
PUSCH, or
a combination of PRACH and PUSCH.

15. A non-transitory storage medium, storing computer instructions, wherein the computer instructions, when being executed, perform the method according to claim 1.

16. A multi-card user equipment having at least a first subscriber identity module (SIM) card in a connected status with a network and a second SIM card, comprising a memory and a processor, wherein the memory stores one or more programs, the one or more programs comprising computer instructions, which, when executed by the processor, cause the processor to:
determine a wireless operation demand of the second SIM card, and request a transmission time gap from the network according to the wireless operation demand, for enabling the second SIM card to execute a wireless operation in the transmission time gap; and
generate a gap adjustment request according to the wireless operation executed by the second SIM card, and send the gap adjustment request to the network, for enabling the network to adjust allocated transmission time gap according to the gap adjustment request.

17. The method according to claim 1, wherein the gap adjustment request is used to request to release the transmission time gap or extend the time of the transmission time gap.

18. A non-transitory storage medium, storing computer instructions, wherein the computer instructions, when being executed, perform the method according to claim 9.

* * * * *